(12) United States Patent
Duffy et al.

(10) Patent No.: US 6,454,504 B2
(45) Date of Patent: Sep. 24, 2002

(54) SELF-LOCKING INTERNALLY THREADED FASTENER AND METHOD OF MANUFACTURE

(75) Inventors: Richard J. Duffy, Shelby Township, MI (US); Eugene D. Sessa, Harrison Township, MI (US)

(73) Assignee: Nylok Fastener Corporation, Macomb, MI (US)

( * ) Notice: Subject to any disclaimer, the term of this patent is extended or adjusted under 35 U.S.C. 154(b) by 0 days.

(21) Appl. No.: 09/924,706

(22) Filed: Aug. 8, 2001

Related U.S. Application Data

(62) Division of application No. 09/460,862, filed on Dec. 14, 1999.

(51) Int. Cl.[7] .................................................. F16B 39/34
(52) U.S. Cl. ........................ 411/304; 411/324; 411/903
(58) Field of Search .................................. 411/302, 303, 411/304, 902, 903, 324

(56) References Cited

U.S. PATENT DOCUMENTS

| | | | | |
|---|---|---|---|---|
| 3,731,724 A | * | 5/1973 | Dorflinger | 411/302 |
| 3,908,727 A | * | 9/1975 | Osborne | 411/304 |
| 4,775,555 A | | 10/1988 | Duffy | |

FOREIGN PATENT DOCUMENTS

EP          0 759 511 A1     7/1996

OTHER PUBLICATIONS

European Search Report—Application No. 00200479.4
Article taken from "*Advancing Fastener Application Engineering*", *Advancements in prevailing–torque locknuts reflected in four IFI standards*, by James R. Davis 1969.

* cited by examiner

*Primary Examiner*—Neill Wilson
(74) *Attorney, Agent, or Firm*—Niro, Scavone, Haller & Niro

(57) ABSTRACT

The present invention is directed to an internally threaded prevailing-torque type self-locking fastener which employs a patch of fused thermoplastic material as the locking element and which satisfies the functional torque requirements of both IFI 100/107 (1987) and IFI 101 (1987). In accordance with the present invention the fastener comprises a metal body having a bore extending to its opposing ends, the bore having a threaded surface; a patch of polymeric material applied and fused to a portion of the threaded surface; and the fastener meeting the prevailing-torque characteristics specified in both IFI 100/107 (1987) and IFI 101 (1987). The invention is also directed to a process wherein an internally threaded fastener is processed by first applying and fusing a polymeric resin material to at least a portion of the fastener's threaded surface and thereafter conditioning the frictional properties of the fastener such that its prevailing torque performance characteristics meet both IFI 100/107 (1987) and IFI 101 (1987).

1 Claim, 4 Drawing Sheets

SELF-LOCKING INTERNALLY THREADED FASTENER AND METHOD OF MANUFACTURE

This is a division application of U.S. patent application No. 09/460,862, filed Dec. 14, 1999.

BACKGROUND OF THE INVENTION

The present invention relates generally to threaded fasteners and, more particularly, to internally threaded prevailing-torque type self-locking fasteners and a method for their manufacture.

Prevailing-torque self-locking fasteners are well known in the art. These fasteners are frictionally resistant to rotation due to a self-contained prevailing-torque feature, often called a "locking element." A variety of different prevailing-torque fasteners are known, including so-called "all metal" fasteners and "plastic patch," "plastic strip" or "plastic pellet" fasteners. As their respective names imply, these fasteners achieve a self-locking or prevailing-torque function due to the characteristics of the particular locking element employed.

The present invention is directed only to prevailing-torque type, self-locking fasteners that employ a patch of thermoplastic material as the locking element. Moreover, the invention is directed to internally threaded fasteners. Such patch type internally threaded self-locking fasteners are well known in the art and a variety of machines and processes for their manufacture are also known, as disclosed, for example in U.S. Pat. Nos. 3,858,262; 3,894,509; 3,995,074; 4,054,688; 4,060,868; 4,100,882; 4,366,190; 4,775,555; 5,141,771; 5,221,170; 5,511,510; 5,620,520; and 5,718,945. The disclosures of these listed U.S. Patents are incorporated herein by reference.

It is known that a large market exists for internally threaded self-locking fasteners having relatively stringent functional specifications. That is, the torque required to achieve a particular clamp load between mated internally and externally threaded fasteners must be no more than a specified maximum, while the torque required to disengage the mated fasteners must exceed a specified minimum. The Industrial Fasteners Institute ("IFI") has promulgated standards relevant to such specifications. For example, IFI 100/107 (1987) defines a maximum installation torque that cannot be exceeded and minimum removal torques (both for the first and fifth removals) that must be exceeded. Similarly, IFI 101 (1987) also defines a torque window—both minimum and maximum—that the torque for a specific fastener must meet. Such fasteners, used typically in the automotive industry and particularly on large over highway trucks, have been conventionally fabricated as all-metal, self-locking fasteners, where the locking element is in the form of distorted threads or a distorted metal body. These all-metal, self-locking fasteners have created numerous problems in the trucking industry. Typically, the distorted thread concept requires a cadmium plating but even here, when driven into an assembly, there is a metal to metal galling effect that takes place resulting in varying installation torque levels which, in turn, lead to over-tightening or under-tightening and, therefore, in lost production due to replacement of faulty joints. If the cadmium plating is replaced with other platings, typically zinc, the conditions are exacerbated. Much higher clamping torques are required to attain the same clamp loads.

All-metal locknuts also remove or damage the protective coating on the mating external threads; thus, resulting in bare metal exposure to the elements with the end result being oxidation or rusting effects. Additionally, over torquing sometimes causes the nut to be driven into the frame assembly resulting in scarring or scraping to the affected area, which requires removal of the assembly, reworking the damaged area and reinsertion back into production. This results in lost production, higher assembly costs and poor quality.

The plastic patch type, self-locking internally threaded fasteners of the present invention eliminate the above problems by meeting, or even exceeding, the IFI torque requirements of specifications 100/107 and 101 for all-metal cadmium plated nuts-even when the fasteners are zinc plated. Additionally, the self-locking fasteners of the present invention provide improved functional performance with a fastener that is lighter in weight and lower in cost than a corresponding all-metal locknut.

SUMMARY OF THE INVENTION

The present invention is directed to an internally threaded prevailing torque type self-locking fastener which employs a patch of fused thermoplastic material as the locking element and which satisfies the functional torque requirements of both IFI 100/107 (1987) and IFI 101 (1987).

In accordance with the present invention the fastener comprises a metal body having a bore extending to its opposing ends, the bore having a threaded surface; a patch of polymeric material applied and fused to a portion of the threaded surface; and the fastener meeting the prevailing-torque characteristics specified in both IFI 100/107 (1987) and IFI 101 (1987).

The invention is also directed to a process wherein an internally threaded fastener is processed by first applying and fusing a polymeric resin material to at least a portion of the fastener's threaded surface and thereafter conditioning the frictional properties of the fastener such that its prevailing torque performance characteristics meet both IFI 100/107 (1987) and IFI 101 (1987).

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings in which:

DETAILED DESCRIPTION OF THE PREFERRED EMBODIMENTS

Figure 1:
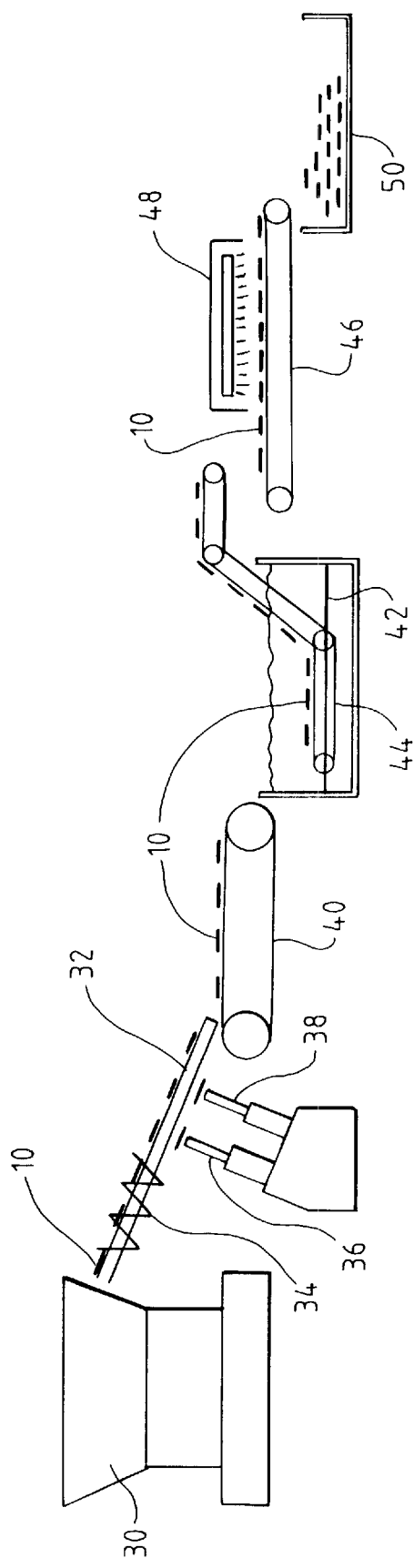
FIG. 1 is a schematic diagram illustrating the sequence of process steps used in accordance with a preferred embodiment of the present invention.

The basic component of the present invention is an internally-threaded fastener fabricated from a metal or metal alloy. The fastener has a body 10 with a bore 12 extending to its opposing ends 14 and 16. The body 10 can be fabricated from any well known metal and may, optionally, be plated with zinc, cadmium or other materials to provide anti-corrosion properties or improved aesthetics. Typically, the bore 12 is threaded along its entire length, with the exception of a short counter sink at each end, thereby forming a threaded surface 18, terminating with so-called "lead threads" at ends 14 and 16.

The locking element is in the form of a patch 20 of thermoplastic material applied and fused to at least a portion of the threaded surface 18. Most preferably, the patch 20 is well defined and generally rectangular in shape, with little or no incidental polymer deposits located outside the main body of patch 20. Thus, the lead threads at both ends of the fastener will be substantially free of polymer deposits, facilitating the initial engagement of the fastener with its complimentary mating male fastener. A wide variety of plastic materials may be employed in the practice of the present invention. However, a nylon thermoplastic resin has been found particularly useful. For example, nylon 11 supplied by the Morton Powder Division of Rohm and Haas Company under the trade names Corvel 76-5001 or Corvel 76-5004 have been found satisfactory.

The nylon patch locking element 20 is applied and fused to the threaded surface 18 of the fastener using any of the well known techniques disclosed in the prior art, such as those disclosed in several of the above-listed patents. Typically, the fastener is preheated, using an induction coil heater and then an air-entrained stream of nylon powder is directed onto its threaded surface 18. The powder thereby melts and forms a generally molten mass on a portion of the threads which, upon cooling, forms a solid plastic patch fused to the threaded surface.

One such processing system is illustrated in FIG. 1. As shown, the fasteners 10 are fed from a feed bowl 30 down an escapement track 32, through an induction coil heater 34 and into a spray station having two powder applicators 36, 38. The first applicator 36 directs a first air-entrained powder stream onto the threaded surface of the fastener, and the second applicator 38 directs a second air-entrained powder stream over the first applied powder. It has been found advantageous to build the patch with multiple, at least two, powder spray applications. This allows better control of patch coating weight, patch definition and increased production. The fasteners then proceed onto a conveyor 40 where they are air-cooled for a short time, from about one to five minutes, and then immersed in a conditioning bath 42. The fasteners are cooled, either in ambient air or by passage through a forced-air cooling chamber, to maintain the temperature of the conditioning bath below 212° F. Conveyor 44 carries the fasteners through bath 42 and deposits them onto still another conveyor 46 which carries the fasteners through an infrared drying oven 48 and ultimately drops the fasteners into any suitable shipping or storage container 50.

Figure 2:
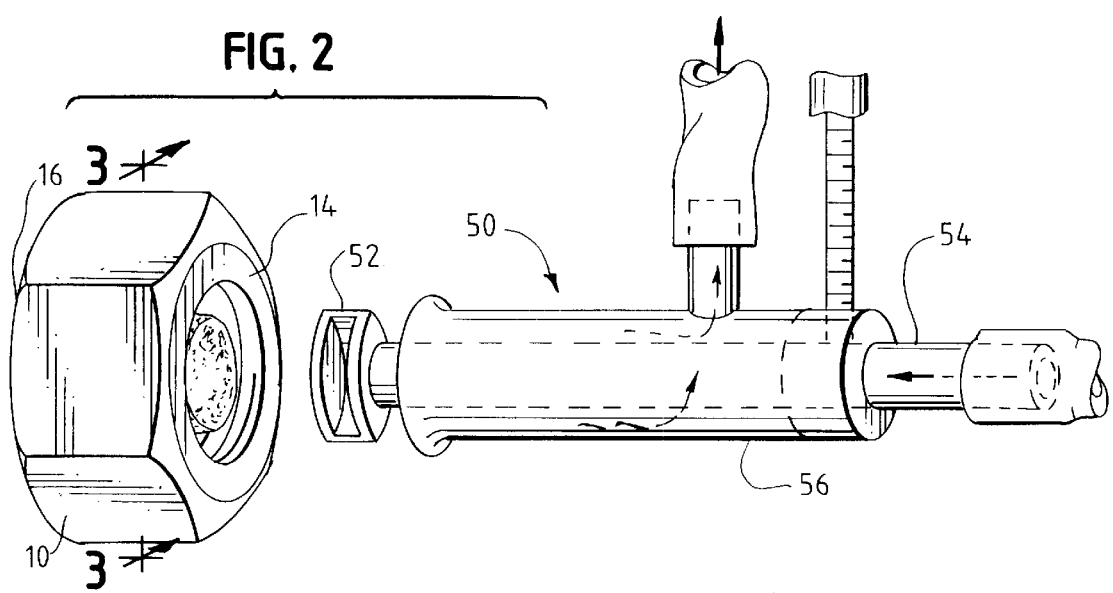
FIG. 2 is a perspective view illustrating an example of a self-locking nut having an applied plastic patch on its threaded surface and a preferred patch applicator used in the practice of the present invention, with the nut having been rotated 180° after patch application to show the patch location within the nut.
Figure 3:
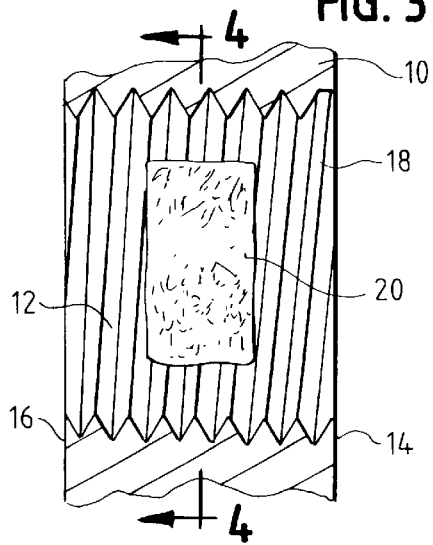
FIG. 3 is a cross-sectional view taken along line 3—3 of FIG. 2.
Figure 4:
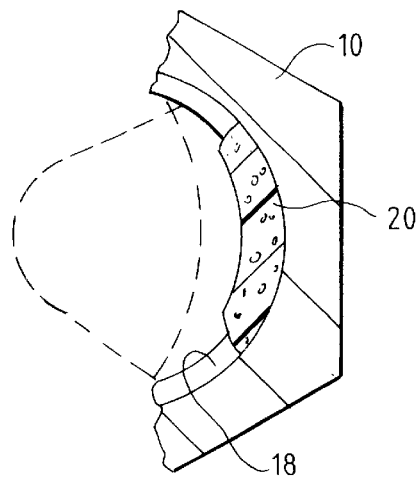
FIG. 4 is another cross-sectional view taken along line 4—4 of FIG. 3.
Figure 5:
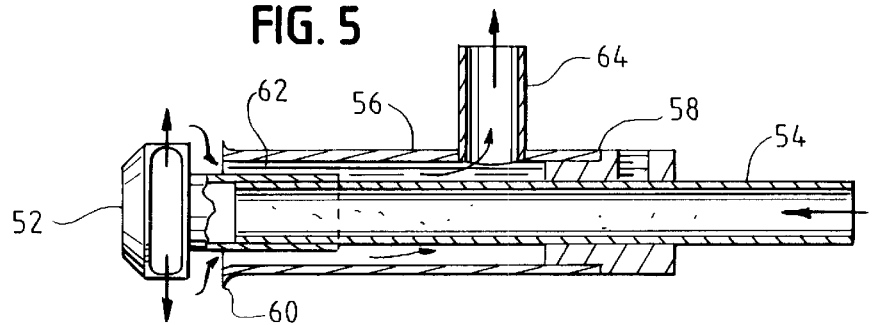
FIG. 5 is a cross-sectional view taken generally along the axial center line of the applicator illustrated in FIG. 2.
Figure 6:
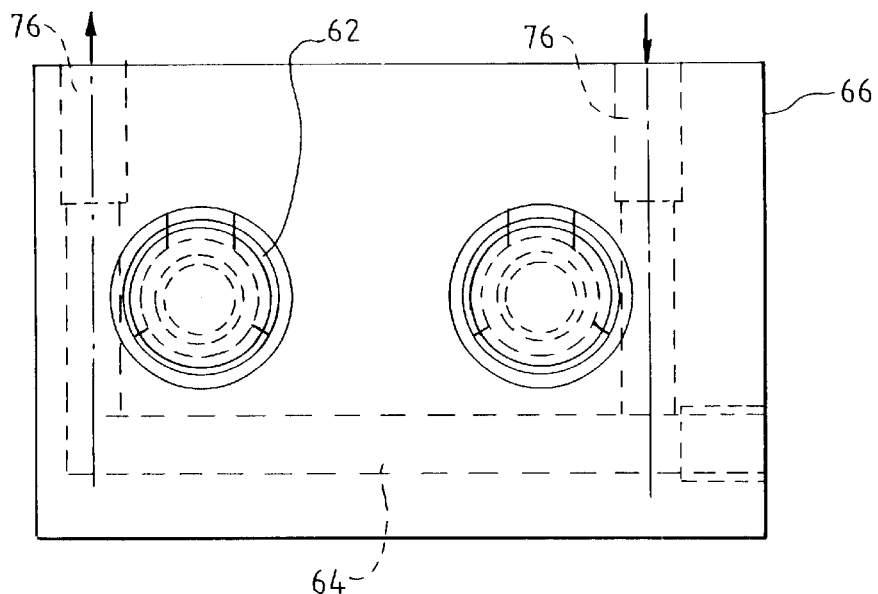
FIGS. 6–10 are illustrations of another preferred embodiment of a patch applicator useful in the practice of the present invention.
Figure 7:
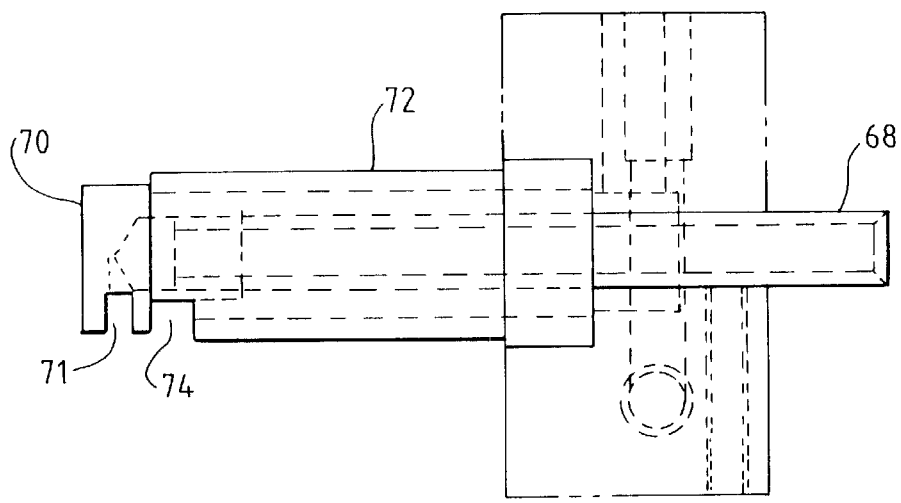
Figure 8:
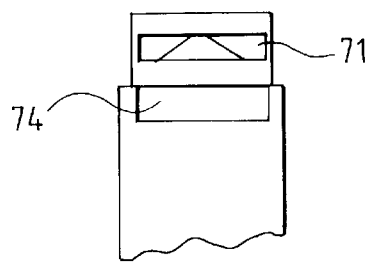
Figure 9:
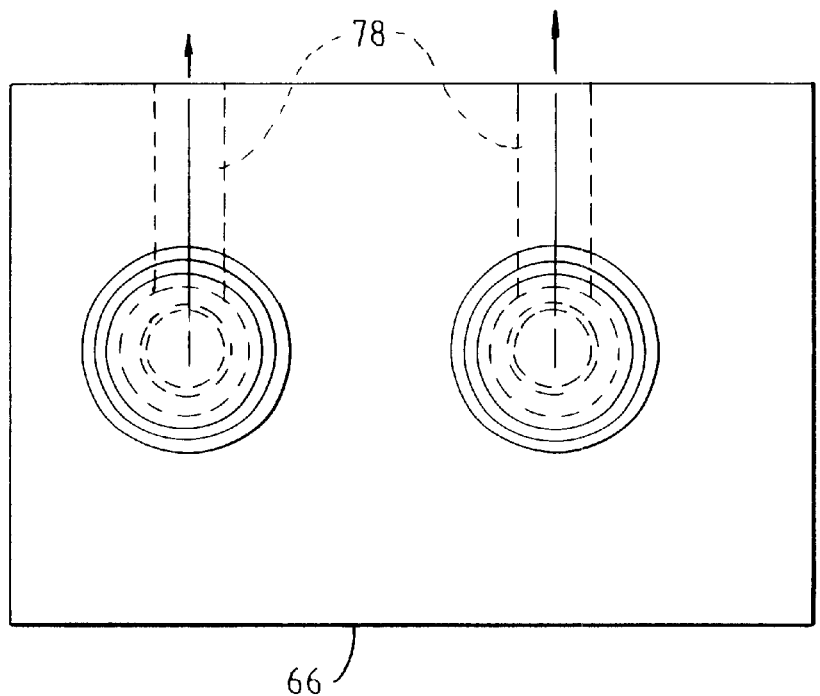
Figure 10:
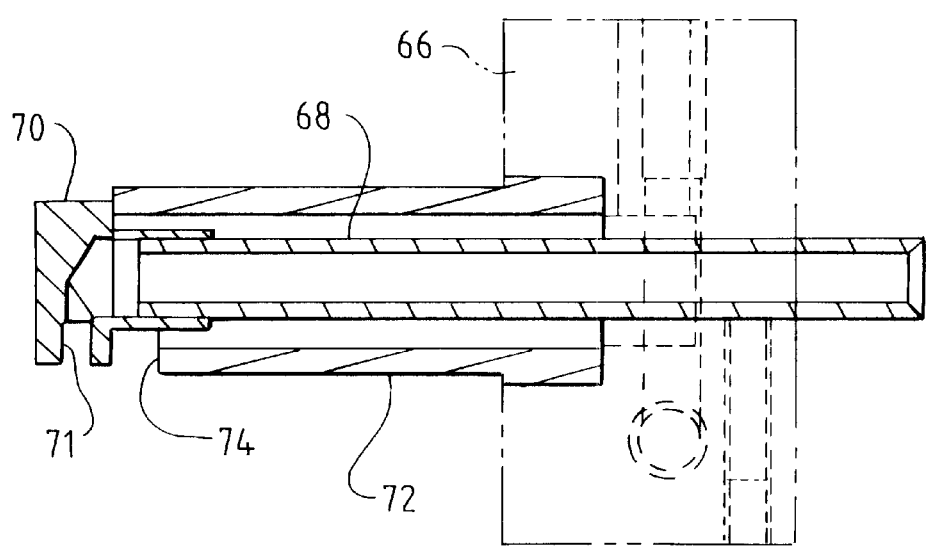

In accordance with one preferred embodiment of the present invention, the applicator employed to form and direct the air-entrained powder into the fastener is that illustrated in FIGS. 2 and 5. The applicator 50 comprises a spray head or nozzle 52, forming a generally arcuate, radially opening slot which is supplied with a pressurized air stream carrying the air-entrained nylon powder via conduit 54. While the arcuate extent of the spray nozzle 52 may be varied, it has been found that an arcuate slot in the range of about 60°–75° is preferred, with an arc of about 68° being found optimal. A cylinder 56 is mounted concentrically around conduit 54, the cylinder having a closed end 58 and an open end 60 located immediately adjacent nozzle 52. These components thereby define a generally annular vacuum nozzle 62 connected to a vacuum source via port 64.

The nylon powder may be delivered to the threaded surface 18 of the fastener with the nozzle 52 located at a fixed axial position within bore 12. However, unexpected advantages have been obtained by applying the powder while the nozzle 52, together with vacuum nozzle 62, moves axially within bore 12. Most preferably, the powder is applied while the nozzles 52 and 62 move axially first in one direction and then in the opposite direction along only an interior portion of the bore 12. This powder application technique has been found to substantially reduce the variance in prevailing-torque performance values that otherwise occur with a stationary nozzle, depending upon the angular orientation of the nozzle relative to the start point of the fastener's lead threads.

Another applicator mechanism is illustrated in FIGS. 6–10. Here, two applicators 62 and 64 are mounted in a base block 66. The applicators each include a central conduit 68, terminating in a powder spray nozzle 70 with dispensing slot 71. A cylinder 72 is mounted concentrically around conduit 68 and has a radial cut at its free end which forms a vacuum slot 74 when the spray nozzle 70 is mounted over it. Both the spray nozzle slot 71 and the vacuum slot 74 define an arc of about 68°. The block 66 includes passageways 76 for transmission of a coolant (as indicated by the arrows) and vacuum ports 78 which communicate with the interior of cylinder 72.

As mentioned previously, the fasteners made in accordance with the present invention achieve the prevailing-torque performance characteristics of both IFI 100/107 (1987) and IFI 101 (1987). The ability to meet both the clamp load torque window and minimum removal torques specified in these IFI standards results, in part, from a post patch application treatment which conditions the frictional properties of the nylon patch locking element and the threaded surface of the fastener, as well. Preferably, the fastener with the pre-applied patch is immersed, sprayed or otherwise effectively wetted with a wax containing aqueous emulsion. In the process illustrated schematically in FIG. 1, this conditioning treatment is carried out by immersion of the fasteners in bath 42. While a variety of natural or synthetic waxes may be employed, a bath comprising an aqueous hydrocarbon wax dispersion has been found satisfactory. One suitable hydrocarbon wax dispersion is manufactured under the trade designation OKS 1765 by OKS Specialty Lubricants International GmbH P.O.B. 50 04 66, D-80974 Munich, Germany. A mixture of about 15% to about 30%, and preferably about 20% (by volume) of OKS 1765 in water, works well in the practice of the present invention. The fasteners are thoroughly wetted with the solution and thereafter dried in any conventional manner.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

We claim:

1. A prevailing-torque internally threaded fastener comprising:

a metal body having a bore extending to opposing ends of the body, said bore including a threaded surface;

a patch of polymeric material fused to at least a portion of the threaded surface; and said fastener having prevailing-torque performance characteristics meeting both IFI 100/107 and IFI 101 standards.

* * * * *